March 2, 1971 A. J. VAN NOORD 3,566,703
LATCH RELEASE OPERATING MECHANISM
Filed March 28, 1968 2 Sheets-Sheet 1

INVENTOR.
Andrew J. Van Noord
BY
Dale A. Winnie
ATTORNEY

March 2, 1971  A. J. VAN NOORD  3,566,703
LATCH RELEASE OPERATING MECHANISM
Filed March 28, 1968  2 Sheets-Sheet 2
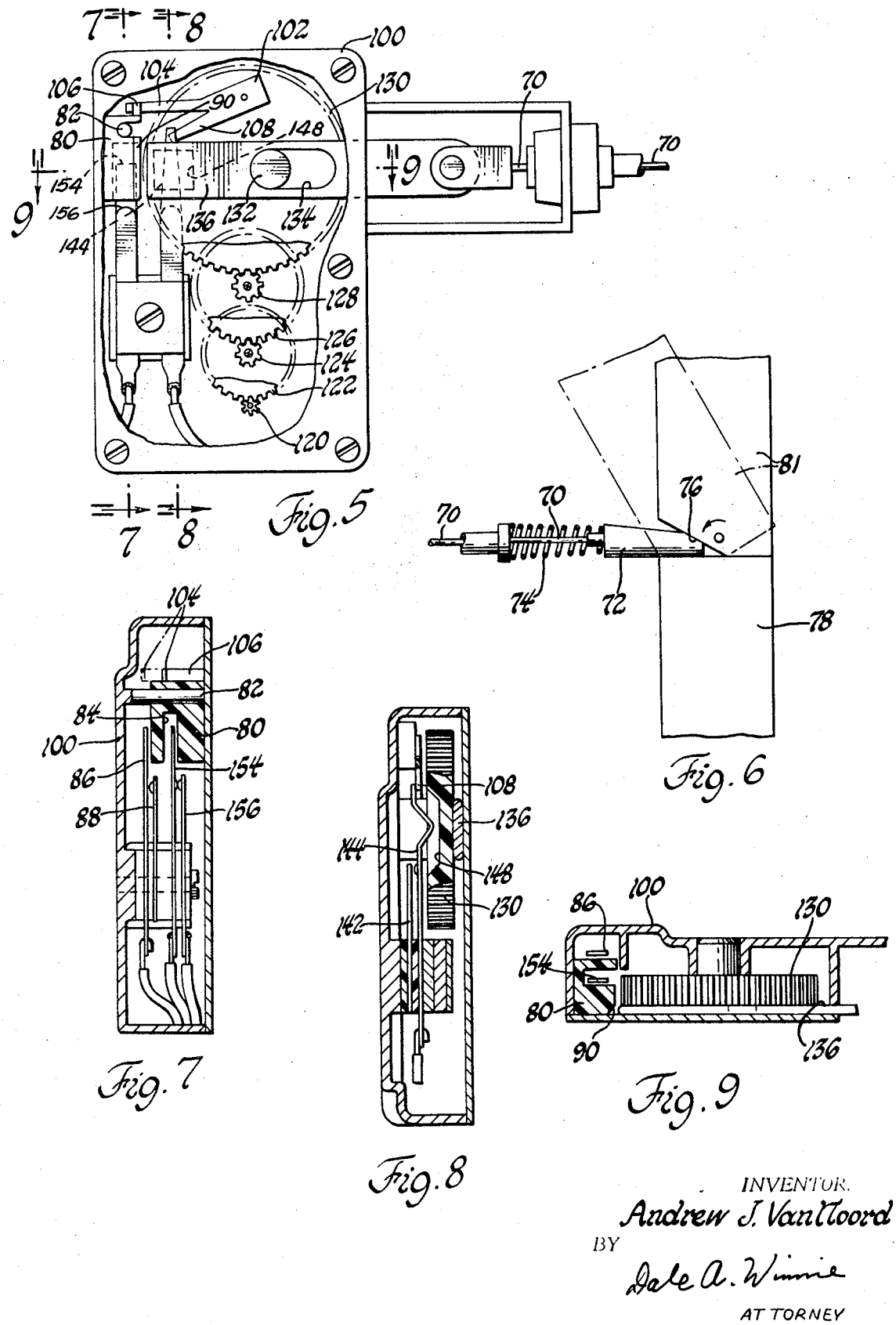
INVENTOR.
Andrew J. Van Noord
BY
Dale A. Winnie
ATTORNEY United States Patent Office 3,566,703
Patented Mar. 2, 1971

3,566,703
LATCH RELEASE OPERATING MECHANISM
Andrew J. Van Noord, Grand Rapids, Mich., assignor to
Kent Engineering, Grand Rapids, Mich.
Filed Mar. 28, 1968, Ser. No. 716,959
Int. Cl. B60r 25/02
U.S. Cl. 74—50          5 Claims

ABSTRACT OF THE DISCLOSURE

A small electric motor drives a gear train set having a latch retracting link connected to it by an eccentric in a lost-motion slot. The link opens the starting circuit in its retracted position, while a cam switch engaging one of the gears provides a holding circuit. An electrical brake and other interlocking circuit switches are also provided for a steering column latch actuator.

BACKGROUND OF THE INVENTION

In automobiles with lower profiles and more reclining seats, the steering wheel and column present an obstacle in getting into and out of the driver's seat. As a consequence, there is a growing interest in steering systems which permit the steering wheel and part of the steering column to be retracted, collapsed or folded to one side for greater convenience in entering and leaving such vehicles.

Steering column arrangements of this kind, as presently known, are used on custom made and more expensive models of production cars and include a steering column part which folds or pivots to one side, carrying the steering wheel with it. A heavy spring biased latch mechanism or sear pin arrangement is used to hold the steering column erect, and is either vacuum or solenoid operated to provide the power necessary to retract the latch or sear pin and overcome the spring biasing and frictional load which it is under. However, the vacuum systems are slow and sluggish when the steering column part is being reset, because of vacuum drag, vacuum hoses are difficult to route, and the solenoid operated means require an oversized coil for the power necessary to initially draw the latch or sear pin.

A similar problem exists in other latch operating mechanisms where the latch member is under a heavy spring load or otherwise requires considerable power to release it, as in a trunk lid latch for automotive vehicles, because of how tightly the trunk lid is held, and where any drag resistance in resetting the latch would be a disadvantage, as again in trunk lid latches where the trunk lid must be slammed or otherwise forcibly closed to reset the latch mechanism.

SUMMARY OF THE INVENTION

The present invention is directed to latch operating mechanisms in general, and more particularly to a small electric motor operated system particularly suited for use with folding or pivoted steering column arrangements, trunk release latches and the like, wherein the previously mentioned problems exist.

A compact gear train arrangement is used for greater power output with a small sized electric motor and to minimize the initial torque resistance which has apparently discouraged the use of electrical motor operated systems heretofore. In addition, an eccentrically located pin on the largest gear member is used to retract a latch or sear pin operating link and is provided in an elongated slot in the link to permit the motor and its associated gear members to cycle without resetting the latching member.

In a simplified sysem, such as would be used for operating a trunk releasing latch, the operating link is used to open switch contacts in its retracted position, while a cam switch associated with the gear train provides a holding circuit to complete the motor driven cycle.

Further refinements include having the operating link actuate a switch block to open switch contacts and which minimizes close tolerance considerations in positioning the switch operating link to prevent arcing across the circuit making contacts.

In situations where motor overrun may be a problem, the cam switch is used to reverse the polarity to the motor and provide an electrical brake which is later released when the latch operating link is reset.

As adapted for use in a folding or pivoting steering column system, the small motor and its gear train are in a compact arrangement and the multiple switches and interlocks for the system are provided in a common housing therewith. The operating link has a cam actuating engagement with a switch block that moves transversely to open switch contacts in the ignition system, to prevent operating the car when the steering column is collapsed, and to open contacts in the latch operating motor starting circuit. The cam switch associated with the gear train closes contacts that provide a holding circuit and which sets the electrical brake on the motor as it drops out after one full revolution. Series switches between the small motor and its electrical power source, and which are actuated in the safety positioning of the transmission control lever, and subsequently opening the vehicle door on the driver's side, provide interlocks in the system precluding inadvertent collapse of the steering column and providing for its automatic release when conditions are right. The whole system is inactive when the steering column is released, but is fully operative after the steering column is reset again.

DESCRIPTION OF THE DRAWINGS

FIG. 5 is a cut-away view of another latch release operating mechanism and one particularly for use with a pivotal steering column as would use the latch release of the previous drawing figure.

FIG. 6 is a schematic illustration of a sear pin latch arrangement for a pivotal steering column as would use the latch release of the previous drawing figure.

FIGS. 7–9 are cross-sectional views taken in the planes of lines 7—7, 8—8 and 9—9, respectively, from FIG. 5, and showing details of construction.

DETAILED DESCRIPTION OF THE INVENTION

Figure 1:
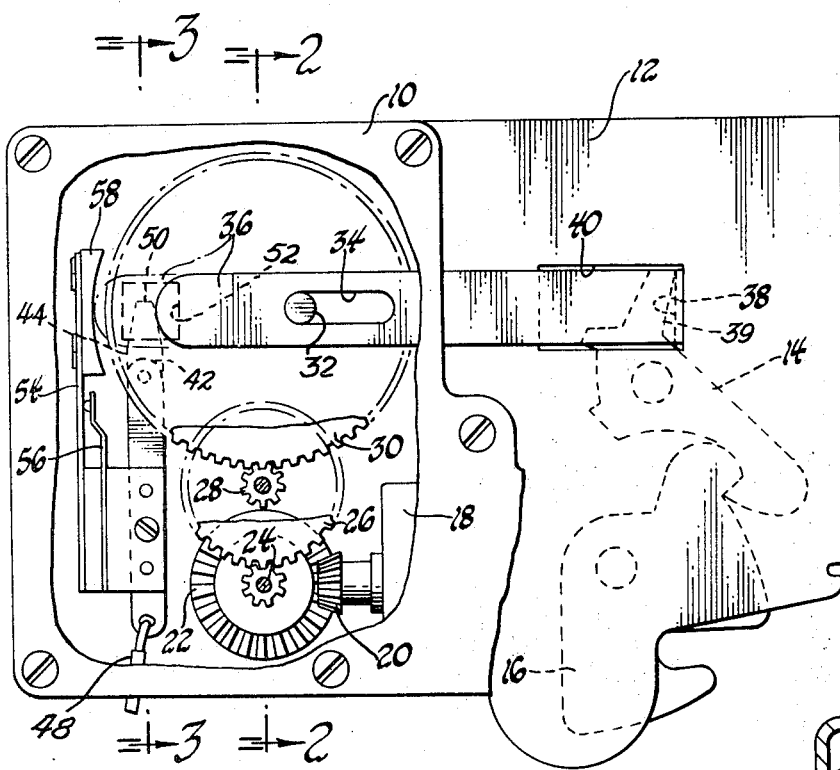
FIG. 1 is a side elevational view of a latch release operating mechanism in accord with the teachings of this invention and having a cover section broken away to show details of construction.

The latch release operating mechanism of this invention is shown in the first drawing figure within a housing 10 attached to a latch housing 12 in a manner for operating the pivotal links and levers 14 and 16 thereof, but not necessarily in proportional size with respect thereto.

A small fractional horsepower electrical motor 18 is shown driving a beveled pinion gear 20 mating with a bevel gear 22 turning a spur gear 24 forming part of a gear train made up of gears 26, 28 and 30. The larger gear member 30 has a pin 32 eccentrically disposed thereon and which is engaged in an elongated slot 34 in a latch operating link 36. In the rotational movement of the gear 30 the link 36 is pulled back from its full line to and beyond the dotted line position as shown in the first drawing figure, and its other end is extended outside of the housing 10 and formed with a tab 38 sticking down in a slot 40 in the latch housing 12 to engage and draw the latch holding lever 14 as by engagement with lever portion 39.

It will be appreciated that the latch lever 16 in serving its intended function is under an appreciable load and that even with the leverage force of the operating link 36 acting on a short lever arm of the holding link 14, considerable effort is necessary to draw it and that such an effort on a small fractional horsepower motor, such as the motor 18, of itself, would mean a starting torque beyond its capacity. However, the gear set provides a power train which enables the small motor to start drawing the latch operating link 36 the moment electrical current is connected to it.

The elongated slot 34 in the latch retracting link 36 serves as a lost motion connection by which the eccentric pin 32 may return to its starting position, without drawing the link 36 with it: it being understood that when the latch lever 16 is reset lever link 14 will pivot clockwise, with reference to the drawing, and, in turn, latch retracting lever 36 will be reset to its full line position due to the engaging relationship between lever 14 and abutment 38.

To assure a single rotation of the larger gear 30 in the gear set, a switch means including a pair of normally spaced circuit making contact arms 42 and 44, with one of the leads 46 and 48 therefrom connected to the motor and the other to the power source, is provided in close spaced relation to the back of gear 30, which is of a non-conductive plastic, and with the contact arm 44 formed with a crook 50 fitting a depression 52 in the back side of the gear and which is so disposed that the switch drops out when the eccentric pin 32 returns to its starting position. Since the switch is also open when the latch retracting link 36 is to be initially actuated, other switch means are necessary to provide the starting circuit.

Another set of circuit making contact arms 54 and 56 are provided in the housing 10 and they are also respectively connected to the power source and the electrical motor (by a connection to the contact arms 42 and 44, respectively). They are normally closed contacts and provide the starting circuit for the motor; it being understood that other circuit making switch means (not shown) initiates power to the circuit described as being within the housing 10.

The switch contact arms 42 and 44 are engaged together when the gear 30 rotates. When the operating link 36 is pulled back to actuate the latch lever, it engages a non-conductive pad 58 on the contact arm 54 to separate the starting circuit contacts. However, the cam switch contacts provide a holding circuit until the contact arm 44 drops out in the depression 52; at the completion of the operating cycle.

Referring now to FIGS. 5–9, a similar latch releasing mechanism is shown in a like housing 100 and including a power train consisting of gears 122, 124, 126, 128 and 130. Although the drive motor is not shown, the pinion gear 120 on the end of the motor shaft is intended to represent the disposition of the motor as behind the housing.

The operating link 136 includes an elongated slot 134, as before, an eccentric pin 132 is provided on the gear 130 and in the slot, and the same lost motion connection and eccentric pin actuation will be appreciated as existing. However, in this particular embodiment the latch retracting link 136 pulls a cable 70 that draws a sear pin 72 biased by a return spring 74 in a sear pin access 76 between a fixed steering column part 78 and a pivotal steering column part 81 to hold the latter erect for use. An appreciable force is necessary to draw the sear pin against the biasing and return force of the spring 74 and to overcome the frictional load it is under between the two steering column parts. But, the power train provided by the gear set is adequate for the task.

Figure 3:
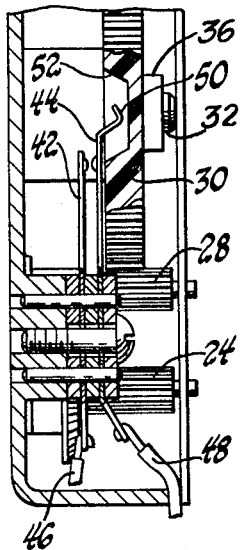
FIGS. 2 and 3 are cross-sectional views taken in the planes of lines 2—2 and 3—3 from the first drawing figure to show a cam switch and the gear train used.

The switch means for the starting and holding circuits, similar to contacts 54 and 56 of FIG. 1, comprises normally closed contact points of arms 154 and 156 disposed for activation by the link 136 in its latch retracted position and with normally open contacts on arms 142 and 144, also similar to contacts 42 and 44 of FIGS. 1 and 3, in the same cam switch arrangement. However, the means for separating the starting circuit contact arms is different and needs describing.

In FIGS. 5, 7 and 9 a small plastic block 80 is shown against a side wall of housing 100 and reciprocal between the back wall and cover of the housing on a fixed pin 82. It is formed with a slot 84 in which is received the switch contact arm 154 and has another pair of suitable contact arms 86 and 88 disposed therebehind; the latter being in the ignition circuit of a car having the collapsible steering column with which this particular system is used. The contact arms 154 and 86 serve as leaf springs to bias the block 80 towards the housing cover wall and, as best seen in FIG. 9, the corner of the block is chamfered on its face side, as at 90 so that the latch operating link 136 will push it towards the back wall, as the link is drawn back, and cause it to open the switch contacts 154, 156 and 86, 88.

The advantage of this cam-actuated switch-operating reciprocal block arrangement is that the positioning of the latch operating link 136 relative to the switch means is not as critical. The extent to which the switch contact arms are separated is determined by the thickness of the link, since this is the amount the block is moved, and not upon the extent of its travel relative thereto. As a consequence, the chance of arcing across the contacts is eliminated.

Figure 4:
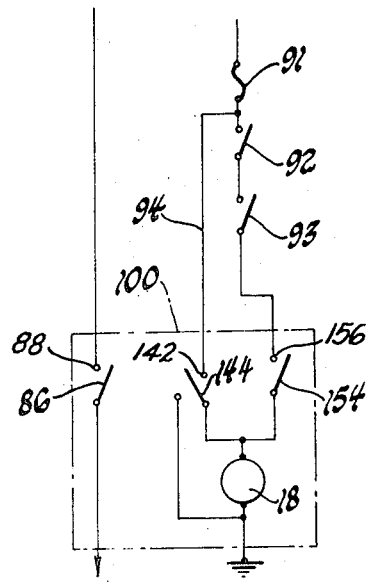
FIG. 4 is a circuit diagram for a steering column latch release mechanism.

Referring now to FIG. 4, the electrical circuit for a latch releasing mechanism, used with a pivotal steering column, includes a fuse or circuit breaker 91 in the connections from the power source, a switch 92 closed when the transmission control is in the "park" position, another switch 93 that is closed when the door on the driver's side is open, and the switching means sensing the erect or tilted condition of the steering column and which includes the contact arm 154. These are all connected in series to the motor 18 and a parallel connection 94 is provided from just below the fuse or circuit breaker 91 to the motor with the cycling switch, including the contact arm 142, provided therein. The ignition control switch, including the contact arm 86, will be appreciated or operated with the sensing switch contact arm 154 by the reciprocal block 80 previously described.

As thus far described, the electrical circuit will be seen to automatically cause the latch releasing link 136 to be actuated when the driver opens his car door, provided the transmission control lever is in park, since the contact arms 154 and 156 are normally engaged and power is available to the motor 18 to operate the gear train and retract the link. The link, in turn, opens the switch contacts 154 and 156 in its retracted position but the cycling switch, represented by contact arms 142 and 144 provides a holding circuit so that the motor continues to drive the eccentric pin 132 to its starting position, in the elongated slot 134 and without disturbing the retracted link.

When the driver is again ready to operate the car, the driver's door will be closed and switch 93 will be open. Consequently, when the steering column is erected and the link 136 is pulled back, causing the switch contacts 154 and 156 to close, the circuit to the latch release operating motor 18 is still open and the steering column will remain erect.

Should the driver's door be open, because it has not been properly closed or otherwise, the cycle will repeat and the steering column will fall to one side; thus providing notice of the safety hazard of an improperly closed vehicle door. In addition, when the steering column is again released, the ignition switch will be opened and the car cannot be started.

Figure 2:
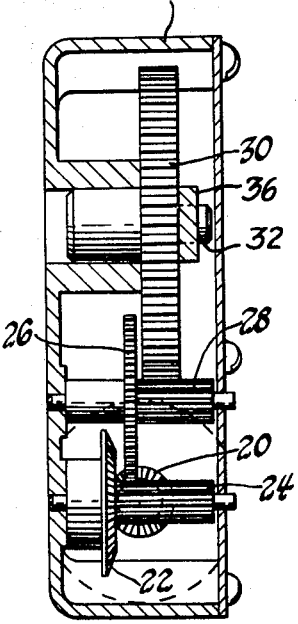

Although a circuit diagram for the embodiment of FIGS. 1, 2 and 3, has not been specifically shown, it should, in view of the above, be apparent that the related control or energizing circuitry containing switch contacts 54, 56 and 42, 44 is functionally similar to but less complicated than the circuitry shown in FIG. 4. As has already been indicated the switch comprised of contacts 54 and 56 and the switch comprised of contacts 42 and 44 are necessarily in parallel circuit with each other. Therefore, in view of the preceding description and with reference to FIG. 4, it should be apparent that a control circuit for the embodiment of FIG. 1 could be as shown in FIG. 4 with contacts 54 and 56 respectively replacing contacts 154 and 156 while contacts 42 and 44 respectively replace contacts 142 and 144. Of course, since the switches 92 and 93 are not discussed with reference to FIGS. 1, 2 and 3, the circuit therethrough would be merely completed as by a continuous closed conductor.

One other important feature is shown in drawing FIGS. 5 and 8 and is represented in the circuit diagram of FIG. 4.

Because of the low torque resistance on the motor 18, it will be appreciated that it may overrun when current is cut off. This is not serious but to avoid the possibility an electrical brake is built into the circuit by means of a forked contact 102 which has a contact arm 104 that is disposed for engagement and grounding contact to the housing by a shoulder member 106 on the switch actuating block 80. The other contact arm 108 is so disposed that the contact arm 144 of the cycling switch engages it just as it falls out and into the depression 148 in the back of gear 130. As a result, the leads of the motor are short circuited immediately after the switch contacts 142 and 144 are opened. The inertia of the motor rotor after opening the contacts causes the motor to act as a generator and short circuiting the leads places a heavy electrical load on the generator which acts as an effective brake.

When the latch actuating link 136 is reset, the switch actuating block 80 moves back, releasing the ground contact arm 104, and the electrical brake is off.

What is claimed is:

1. A power actuated latch operating mechanism, comprising a relatively small sized fractional horsepower low torque resistant motor having a series of progressively larger gear members, providing a gear train set, operatively connected thereto and driven thereby; a latch operating link guided for reciprocal movement and having a lost motion connection with the output gear member of said gear train set by means of a drive pin, operatively connected to said output gear member so as to be eccentrically disposed with respect to the axis of rotation of said output gear member, and a slot formed in said operating link for receiving said drive pin therein; switch means for connecting said motor to a power source, and providing cyclic operation of said output gear member, including one complete revolution thereof; said link having a latch operating stroke during the first half revolution of the output gear member and being inoperative during the second half revolution thereof; and said switch means including a normally closed contact switch, providing a starting circuit for said motor, which is opened by said link during said latch operating stroke.

2. A power actuated latch operating mechanism ac-according to claim 1, wherein said switch means also comprises a normally open contact switch disposed relative to said output gear member for closing actuation thereby following the start of a cyclic revolution of said output gear member.

3. A power actuated latch operating mechanism according to claim 2, wherein said normally closed contact switch and said normally open contact switch are in parallel circuit with each other.

4. A power actuated latch operating mechanism according to claim 2, including additional switch means preset by said link during said latch operating stroke and operative in the circuit of said motor, upon the completion of a full revolution of said output gear member, for reversing the power source connection to said motor and providing an electric brake for said motor and said output gear member.

5. A power actuated latch operating mechanism according to claim 1, wherein said normally closed contact switch includes a circuit-making contact arm disposed for actuation by said link in a direction of movement transverse to said link while said link is in the course of said latch operating stroke, said transverse movement of said contact arm being substantially independent of the total relative length of said latch operating stroke of said link.

References Cited
UNITED STATES PATENTS

| | | | |
|---|---|---|---|
| 2,904,988 | 9/1959 | Gaida | 70—264 |
| 3,151,698 | 10/1964 | Pollock | 180—113 |
| 3,359,767 | 12/1967 | Arlauskas et al. | 70—264 |
| 3,425,504 | 2/1969 | Hass et al. | 180—112X |

A. HARRY LEVY, Primary Examiner

U.S. Cl. X.R.

180—111, 112; 292—201